(12) United States Patent
Artibise et al.

(10) Patent No.: US 7,722,978 B2
(45) Date of Patent: May 25, 2010

(54) MEMBRANE ELECTRODE ASSEMBLY WITH INTEGRATED SEAL

(75) Inventors: Robert H Artibise, Vancouver (CA); Simon Farrington, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 1029 days.

(21) Appl. No.: 11/436,122

(22) Filed: May 17, 2006

(65) Prior Publication Data

US 2006/0269819 A1     Nov. 30, 2006

Related U.S. Application Data

(63) Continuation of application No. 10/395,874, filed on Mar. 24, 2003, now Pat. No. 7,070,876.

(51) Int. Cl.
*H01M 2/00* (2006.01)
(52) U.S. Cl. .............. 429/34; 429/35; 429/38
(58) Field of Classification Search .......... 429/34, 429/35, 38
See application file for complete search history.

(56) References Cited

U.S. PATENT DOCUMENTS

| | | | |
|---|---|---|---|
| 6,020,083 A | 2/2000 | Breault et al. | 429/36 |
| 6,057,054 A | 5/2000 | Barton et al. | 429/42 |
| 6,231,053 B1 | 5/2001 | Wakamatsu | 277/628 |
| 6,316,139 B1 * | 11/2001 | Uchida et al. | 429/36 |
| 6,667,124 B2 | 12/2003 | Suenaga et al. | 429/35 |
| 6,720,103 B1 | 4/2004 | Nagai | 429/36 |
| 6,814,359 B2 | 11/2004 | Senda et al. | 277/639 |
| 6,989,214 B2 | 1/2006 | Mao et al. | 429/35 |
| 2001/0019790 A1 | 9/2001 | Regan et al. | 429/35 |
| 2003/0224237 A1 | 12/2003 | Vanderleeden et al. | 429/35 |

FOREIGN PATENT DOCUMENTS

| | | |
|---|---|---|
| EP | 1 152 477 A2 | 11/2001 |
| EP | 1 220 345 A1 | 7/2002 |
| WO | WO 98/33225 | 7/1998 |
| WO | WO 01/17048 A1 | 3/2001 |
| WO | WO 02/093669 A2 | 11/2002 |

* cited by examiner

*Primary Examiner*—Patrick Ryan
*Assistant Examiner*—Helen O Conley
(74) *Attorney, Agent, or Firm*—Crowell & Moring LLP

(57) ABSTRACT

A membrane electrode assembly with an improved integrated seal comprises an edge seal having an inboard pad attached to the edge of the electrodes, a flexible coupling adjacent the pad, and a sealing element adjacent the coupling. The sealing element is significantly thicker than the pad, and the flexible coupling isolates the pad from stress experienced in the sealing element. Thus, greater compression can be applied to the sealing element, thereby providing an improved and more reliable seal, without overly compressing and damaging the attached pad.

12 Claims, 7 Drawing Sheets

MEMBRANE ELECTRODE ASSEMBLY WITH INTEGRATED SEAL

CROSS-REFERENCE TO RELATED APPLICATION

This application is a continuation of U.S. patent application Ser. No. 10/395,874, filed Mar. 24, 2003, now allowed, which application is incorporated herein by reference in its entirety.

BACKGROUND OF THE INVENTION

1. Field of the Invention

The present invention relates to a membrane electrode assembly having a seal integrated at an edge of the assembly, as well as a solid polymer electrolyte fuel cell containing such an assembly.

2. Description of the Prior Art

Fuel cell systems are currently being developed for use as power supplies in numerous applications, such as automobiles and stationary power plants. Such systems offer promise of efficiently providing power with environmental and other benefits. Fuel cells convert reactants, namely fuel and oxidant, to generate electric power and reaction products. Fuel cells generally employ an electrolyte disposed between two electrodes, namely a cathode and an anode. A catalyst typically induces the desired electrochemical reactions at the electrodes.

Preferred fuel cell types include solid polymer electrolyte (SPE) fuel cells that contain a solid polymer electrolyte and operate at relatively low temperatures. During normal operation of a SPE fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

A broad range of fluid reactants can be used in SPE fuel cells and may be supplied in either gaseous or liquid form. For example, the oxidant stream may be substantially pure oxygen gas or a dilute oxygen stream such as air. The fuel may be substantially pure hydrogen gas, a gaseous hydrogen-containing reformate stream, or an aqueous liquid methanol mixture in a direct methanol fuel cell. Reactants are directed to the fuel cell electrodes and are distributed to catalyst therein by means of fluid diffusion layers.

SPE fuel cells employ a membrane electrode assembly (MEA) which contains the solid polymer electrolyte or ion-exchange membrane disposed between the two electrodes. Each electrode contains a catalyst layer, comprising an appropriate catalyst, located next to the solid polymer electrolyte. The catalyst may, for example, be a metal black, an alloy or a supported metal catalyst, for example, platinum on carbon. The electrodes typically also contain a porous substrate (e.g., a porous electrically conductive sheet material) that may be employed for purposes of mechanical support and/or reactant distribution, thus serving as a fluid diffusion layer. For a gaseous reactant, the fluid diffusion layer is known as a gas diffusion layer (GDL).

The MEA is typically disposed between two plates to form a fuel cell assembly. The plates act as current collectors and provide support for the adjacent electrodes. The assembly is typically compressed (e.g., of order of 70 psi overall) to ensure good electrical contact between the plates and the electrodes, as well as to effect sealing between fuel cell components. A plurality of fuel cell assemblies may be combined in series or in parallel to form a fuel cell stack. In a fuel cell stack, a plate is usually shared between two adjacent MEAs, and thus also serves as a separator to fluidly isolate the fluid streams of the two adjacent MEAs.

Flow fields are typically incorporated into both surfaces of such plates in order to direct reactants across the electrochemically active surfaces of the fluid diffusion electrodes or electrode substrates. The flow fields typically comprise fluid distribution channels separated by landings. The channels provide passages for the distribution of reactant to the electrode surfaces and also for the removal of reaction products and depleted reactant streams. The landings act as mechanical supports for the fluid diffusion layers in the MEA and provide electrical contact thereto. Ports and other fluid distribution features are typically formed in the surfaces at the periphery of such flow field plates. When assembled into a fuel cell stack, the stacked ports can form internal manifolds for distribution of the fluids throughout the stack. The other distribution features typically are provided to distribute fluids from the ports to the appropriate flow fields.

Numerous seals are required in a typical SPE fuel cell stack. For example, seals are typically required around the edges of the various ports, MEAs, and flow field plates in order to appropriately isolate the different fluids within the stack and in order to prevent external leaks. Large cell stacks can comprise hundreds of cells and consequently many hundreds of seals. It is important therefore to employ highly reliable seal designs. However, obtaining highly reliable seals is a continuing challenge. In order to obtain ever greater power density, the trend is to employ the thinnest cells possible in the fuel cell stacks. In turn, this means that the seals employed become thinner, thereby aggravating tolerance stack-up issues. That is, the thinner the seal becomes, the wider the range of compression experienced for any given stack-up tolerances. Thus, either seals must be capable of tolerating greater ranges of compression (e.g., by using multiple seals designed to accommodate different ranges of compression) or ever tighter tolerances are required on the thickness of the cell components.

Many of the seals required in a SPE fuel cell stack can conveniently be integrated into the MEA assemblies as disclosed in U.S. Pat. No. 6,057,054. In such assemblies, seals are integrated at the edge of the MEAs by impregnating the porous electrode layers on either side. The seal extends laterally beyond the edge of the MEA and envelops its periphery. Such a seal can prevent fluid transfer around the edge of the MEA and can also be used to effect fluid tight seals to both adjacent flow field plates. Additional seals for internal ports or manifolds may also be incorporated at the same time as the edge seal for the MEA using an appropriate molding operation. Such designs also allow for the use of flush-cut MEAs (in which membrane and electrodes are cut simultaneously from a larger laminate) and the unitary assemblies are convenient for assembly purposes. However, as mentioned above, highly reliable seals are required for SPE fuel cell stacks and other developments in stack design can place additional demands on the seals. Thus, improvements in seal designs are always being sought.

BRIEF SUMMARY OF THE INVENTION

A membrane electrode assembly with an improved integrated seal is disclosed that is more tolerant to thickness variations in the manufactured components. In previous constructions, as cell designs decrease in thickness, the stack-up of components having typical tolerances could lead to excessive stress experienced in the region where the seal attaches to the MEA (i.e., where the seal is impregnated into the porous electrodes). The seal could then be damaged and delaminate from the electrode, thereby providing leak paths around the edge of the MEA. Such excessive stress might occur directly from overly compressing this region or indirectly from stress transferred through the seal material when the peripheral region of the seal is overly compressed.

The MEA with improved integrated seal includes a membrane electrode subassembly comprising a membrane electrolyte, a porous cathode electrode and a porous anode electrode. The subassembly is planar and has two major surfaces. The MEA is designed to be compressed to a nominal thickness by a compressing surface (typically the compressing surface is a flow field plate). The MEA also includes an improved edge seal made of a seal material, wherein the seal comprises a) an inboard pad adjacent to the two major surfaces at the edges of the membrane electrode subassembly, b) a flexible coupling adjacent the inboard pad and the edge of the membrane electrode subassembly, and c) a sealing element adjacent the flexible coupling.

The pad saturates the pores at the edges of the electrodes around the periphery of the membrane electrode subassembly and is thicker than the membrane electrode subassembly at least at the edges. The pad thickness is such that the stress on the pad is less than the electrode interface stress limit for the seal material when the assembly is compressed to the nominal thickness. In this way, the stress on the pad is insufficient to shear the pad from the saturated membrane electrode subassembly when compressed to the nominal thickness. The geometry of the inboard pad is such that the stress at the electrode interface does not exceed its failure stress. Thus, the pad is not directly compressed to an extent that could cause damage.

The thickness of the flexible coupling is less than that of the inboard pad and is such that a gap remains between the compressing surface and the coupling when the assembly is compressed to the nominal thickness. In this way, the flexible coupling isolates the inboard pad from any stress experienced by the sealing element when the assembly is compressed to the nominal thickness.

On the other hand, the thickness of the sealing element is significantly greater than that of the inboard pad such that the compression on the sealing element is greater than that on the inboard pad when the assembly is compressed to the nominal thickness. (When compressed between the same plates, in order for the thicker sealing element to be compressed more than the thinner pad, the sealing element is substantially thicker than the pad. Unlike in the inboard pad, the resulting stress on the sealing element may exceed the electrode interface stress limit for the seal material.) Thus, even with relatively large variations in the thickness of the cell components, the sealing element can be sufficiently compressed to effect a seal when the assembly is compressed to the nominal thickness.

For instance, when the assembly is compressed to the nominal thickness, the inboard pad may be compressed less than about 25%, while the sealing element on the other hand may be compressed greater than 30%.

Suitable seal materials include certain elastomers such as a silicone characterized by a Shore A hardness of about 40 and a simple tension modulus of about 0.2 MPa at 40% strain. The electrode interface stress limit for such an elastomer when used in combination with conventional membrane electrode subassemblies (e.g., those in which the porous cathode and anode electrodes comprise carbon fiber paper) can be about 1.2 MPa. Other suitable elastomers include an ethylene-propylene-diene terpolymer or a fluoroelastomer.

The integrated edge seal may also comprise additional advantageous features. For instance, the shape of the sealing element may be described by two offset circles perpendicular to the major surfaces of the membrane electrode subassembly. Such a shape allows for the application of a small amount of precompression on the sealing element without affecting its stability under load. Another useful feature is a chamfer on the inboard pad adjacent the electrode surface in order to reduce shear stress concentration at this interface and thereby reduce the risk of seal failure at this interface. Such chamfers can also serve to align and center an adjacent flow field plate when initially assembling a fuel cell stack. Yet another useful feature to include is an insulating tab adjacent the sealing element to help electrically isolate the cathode and anode flow field plates from each other at their edges.

DETAILED DESCRIPTION OF THE INVENTION

Figure 1:
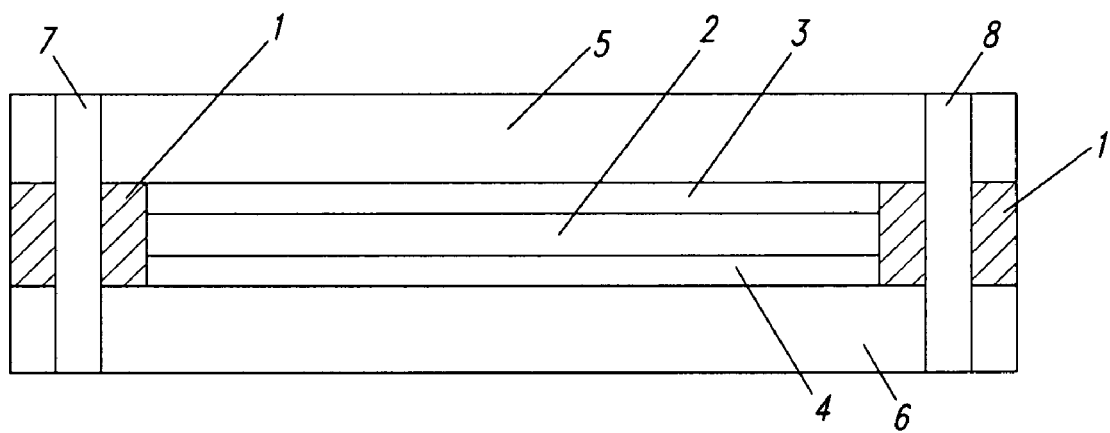
FIG. 1 is a schematic cross-sectional view of a fuel cell assembly in a solid polymer electrolyte fuel cell stack and shows a MEA and associated flow field plates.

As maintained above, a membrane electrode assembly is disclosed having an improved integrated seal. Referring to FIG. 1, a schematic cross-sectional representative view of a fuel cell assembly in a SPE fuel cell stack is presented. For simplicity, only one MEA is shown along with its adjacent flow field plates. A typical stack would comprise many such MEAs separated by shared bipolar flow field plates in which the fuel and oxidant flow fields would appear on opposite surfaces of each shared plate.

In FIG. 1, the MEA includes solid polymer electrolyte membrane 2 sandwiched between and bonded to cathode 3 and anode 4. Flow field plates 5 and 6 are positioned adjacent cathode 3 and anode 4 and provide oxidant and fuel thereto, respectively. Internal manifolds 7 and 8 are direct fuel and oxidant to and from flow field plates 5 and 6. Seal 1 represents a set of seals that prevent mixing of the fuel and oxidant on either side of the MEA, that help form and isolate internal manifolds 7 and 8, and that prevent leaks to the external environment. (Fluid distribution features connecting the manifolds to the respective flow fields in plates 5 and 6 are not shown in this schematic.) Seal 1 is typically compressed between plates 5 and 6. The set of seals represented by seal 1 can conveniently be combined and attached to the subassembly consisting of membrane 2 bonded to cathode 3 and anode 4 in order to form a unitary MEA with integrated seal.

Figure 2A:
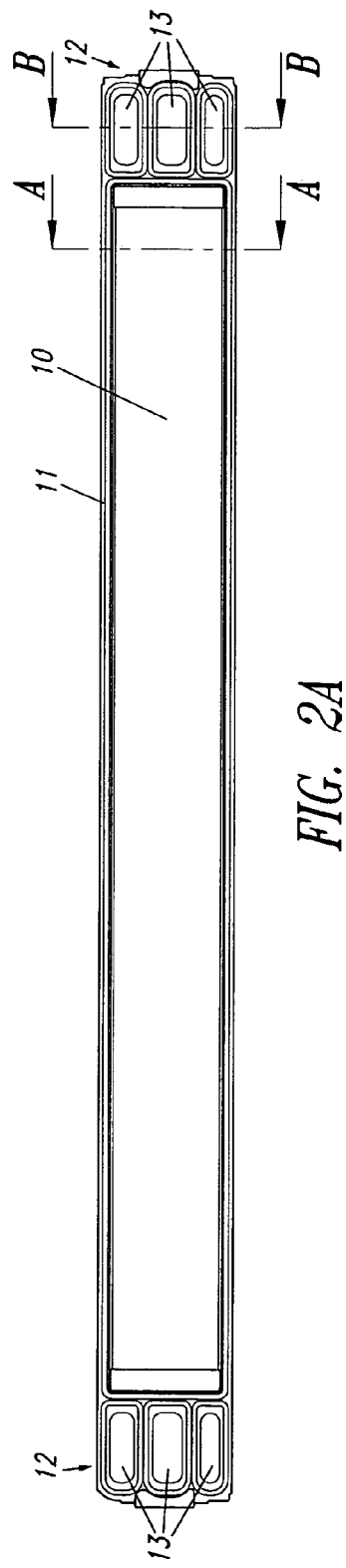
FIG. 2a shows a plan view of a MEA with an improved integrated seal of the invention in which the integrated seal comprises an edge seal and seals for internal manifolds in the stack.

FIG. 2a shows a plan view of a representative MEA comprising an improved integrated seal. In this view, surface 10 of the cathode of the MEA is visible. The integrated seal is formed in a single molding operation and includes edge seal 11 (which is impregnated into the pores at the edge of the cathode around the entire periphery of the cathode) and internal manifold seals 12 at each end of the MEA. In the depicted embodiment, there are three internal manifolds 13 (for fuel, oxidant, and coolant) at each end of the MEA (one set for fluid supply and one set for fluid exhaust).

Figure 2B:
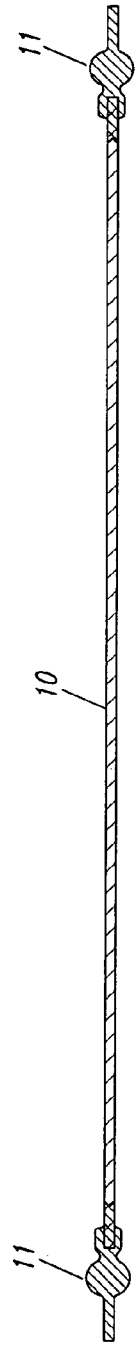
FIG. 2b shows a cross-sectional view of the MEA of FIG. 2a along section A-A.
Figure 2C:
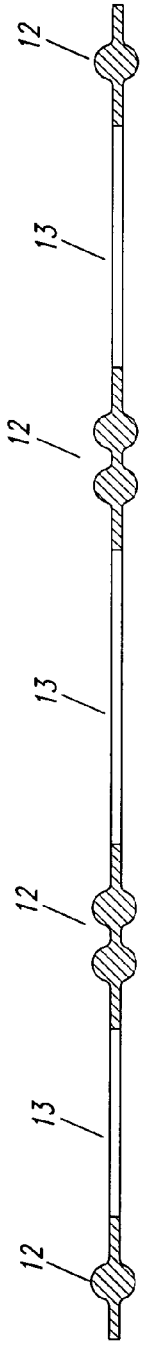
FIG. 2c shows a cross-sectional view of the MEA of FIG. 2a along section B-B.

A cross-sectional view of edge seal 11 is visible in FIG. 2b which shows the profile along section A-A of FIG. 2a. The design and features of edge seal 11 are described in more detail below. A cross-sectional view of internal manifold seals 12 is visible in FIG. 2c, which shows the profile along section B-B of FIG. 2a. As shown, manifold seals 12 have a similar cross-sectional shape as the sealing element in edge seal 11. However, other alternative shapes may be employed if desired.

Figure 3A:
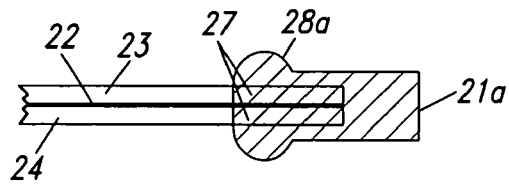
FIG. 3a shows a cross-sectional view of the edge of a first prior art MEA with integrated seal.
Figure 3B:
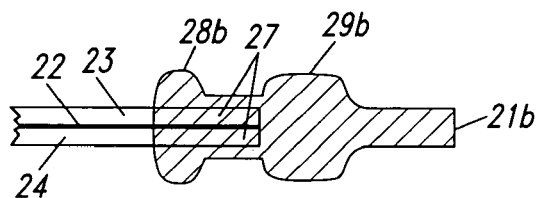
FIG. 3b shows a cross-sectional view of the edge of a second prior art MEA with integrated seal.
Figure 3C:
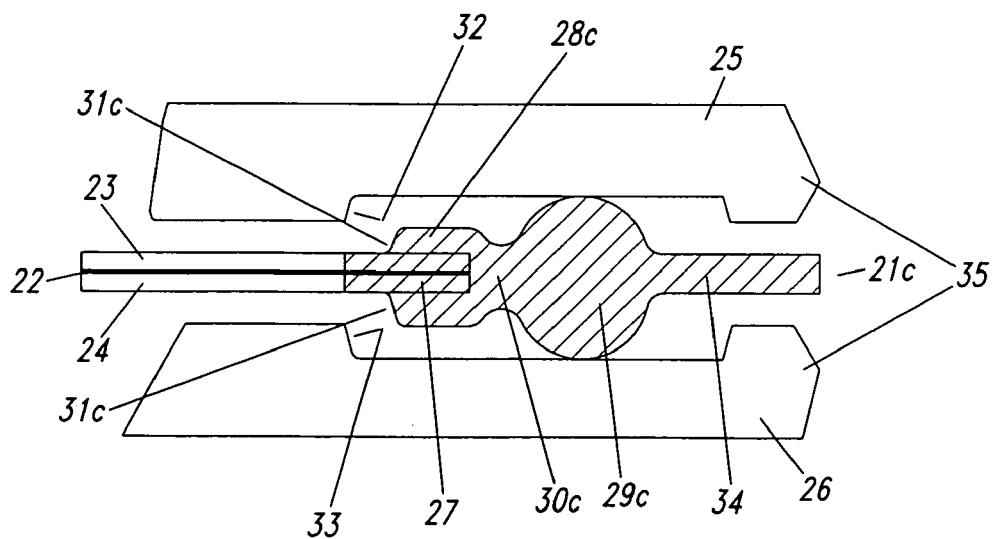
FIG. 3c shows a cross-sectional view of the edge of a MEA with an improved integrated seal of the invention.

FIG. 3c shows a magnified cross-sectional view of the edge seal of FIG. 2b along with portions of flow field plates 25 and 26 that would be employed adjacent the MEA in the construction of a cell stack. In FIG. 3c, edge seal 21c is shown prior to compression between plates 25 and 26. For purposes of comparison, two prior art edge seal designs for an MEA with integrated seal are shown in FIGS. 3a and 3b respectively.

The MEA subassemblies in each of FIGS. 3a, b, and c are the same and comprise a laminate of electrolyte membrane 22, cathode electrode 23, and anode electrode 24. Also, in each of FIGS. 3a, 3b and 3c, the material used to form the edge seal is impregnated into the pores of both electrodes 23 and 24 in regions 27. The impregnated material saturates the pores thereby preventing gas from leaking around electrolyte membrane 22 at the edge of electrodes 23 and 24. Further, the impregnated material serves to anchor edge seals 21a, b, and c to their respective MEA subassemblies. For a stronger bond to the MEA subassembly, it is advantageous for the molded edge seal to extend outside the pores of the electrode and to encapsulate the entire end of the MEA subassembly as shown in each of these Figures.

In the first prior art edge seal 21a in FIG. 3a, a sealing element 28a is located on either side of the MEA subassembly and is connected to the material impregnated into the pores in regions 27. (The impregnating of the pores and the formation of sealing element 28a are accomplished at the same time in a single molding step.) When compressed between two flow field plates (not shown), sealing element 28 is pinched between electrolyte membrane 22 and the flow field plates, thereby effecting a seal. While a satisfactory seal may be made in this fashion, sealing element 28a typically cannot be overly compressed (e.g., more than about 30%) without the resulting stress causing material failure at the interfaces with the electrodes. (With little strain present in the material impregnating regions 27 and substantial strain in the material outside electrodes 23, 24, a large strain gradient exists at the interfaces.) When this occurs, sealing element 28a detaches from the electrodes 23, 24 and creates a leak path around the electrolyte membrane 22.

The second prior art edge seal 21b in FIG. 3b has two sealing elements 28b and 29b. Sealing element 28b is formed similarly to sealing element 28a in FIG. 3a and functions in a like manner. Sealing element 29b is formed adjacent to the edge of the MEA subassembly and, as shown, is about as thick as sealing element 28b. When compressed between two flow field plates (not shown), sealing element 29b provides a secondary seal between the two flow field plates, thereby preventing external leaks from the fuel cell. If properly restrained, sealing element 29b may be able to maintain a suitable secondary seal even if substantially compressed. Again, however, if sealing element 28a is overly compressed, failure may occur at the interface with electrodes 23 and 24, resulting in a leak path around the electrolyte membrane. Although the absolute compression on each of sealing elements 28b and 29b is nominally the same (i.e., same reduction in thickness), the relative compression (i.e., % decrease in thickness) of each of the two separate sides of sealing element 28b is much greater than that of sealing element 29b.

However, edge seal 21c shown in FIG. 3c is designed such that sealing element 29c can be substantially compressed without there being undue strain at the interface with the impregnated electrodes. Edge seal 21c has an inboard pad 28c that, like the preceding prior art designs, is connected to the material impregnated into the electrode pores (regions 27) and is part of the material encapsulating the end of the MEA subassembly. Inboard pad 28c does not function as a seal but does strengthen the bond between edge seal 21c and the MEA subassembly. Inboard pad 28c also serves to limit the compression on sealing element 29c in the event that the assembly is compressed beyond nominal. The thickness of inboard pad 28c is thus greater than the MEA subassembly, but is such that, when the whole assembly is compressed between flow field plates 25 and 26 to its nominal thickness, the stress within pad 28c is less than that which would cause it to detach from the electrodes, i.e., is less than its shear stress limit at the electrode interface. This can be accomplished, for instance, by having inboard pad 28c just contact adjacent flow field plates 25 and 26 (i.e., zero compression) when the assembly is at its nominal thickness. Should the assembly be compressed to less than this nominal thickness however, inboard pad 28c serves to limit the compression on sealing element 29c but of course then starts to be subjected to some compressive stress. However, as those skilled in the art will appreciate, inboard pad 28c can take some significant compressive stress (and hence the assembly can tolerate some significant variation in component thickness) without exceeding the shear stress limit at the electrode interface.

Sealing element 29c, however, is substantially thicker than inboard pad 28c and is significantly compressed (e.g., >30% compression, more than typical industrial seals) when the whole assembly is compressed to its nominal thickness in a fuel cell stack. The stress within sealing element 29c may be significantly greater than that which would cause inboard pad 28c to detach from electrodes 23 and 24. However, as long as this stress is not transmitted through to inboard pad 28c, such interface damage should not occur. Flexible coupling 30c is thus provided between inboard pad 28c and sealing element 29c in order to isolate the former from stress in the latter. The thickness of flexible coupling 28c is chosen such that there will a gap between it and adjacent flow field plates 25 and 26 when the whole assembly is compressed to its nominal thickness. As such, in the event that the assembly is compressed to less than its nominal thickness, the material forming flexible coupling 28c could be deformed further and there would be some empty space around for it to flow into, instead of transferring stress therethrough to inboard pad 28c.

The design of edge seal 21c in FIG. 3c allows for greater tolerances to be accepted in the associated fuel cell components without compromising reliability of the seals. For instance, typical MEA subassemblies may nominally be about 400-500 micrometers in thickness. With the trend being towards the thinnest cells possible, the thickness of the flow field plates and hence also the sealing elements is gradually being reduced. (The sealing elements are typically seated in a groove in a flow field plate and of course the possible depth of this groove gets reduced along with the thickness of the plate.) A typical prior art sealing element like element 29b may now nominally be about 900 micrometers in thickness when compressed. Thus, sealing elements 28a or 28b may only be about 250 micrometers thick (from electrode interface to flow field plate) when compressed. Consequently, component thickness tolerances of as little as ±50 micrometers can be unacceptable in such a situation.

As an example, consider the embodiment shown in FIG. 3b with an MEA subassembly about 400 micrometers thick (ignoring MEA compression) and a sealing element 29b about 1200 micrometers thick when uncompressed and about 900 micrometers when nominally compressed (about 25% compression). This means sealing element 28b is about 400 and 250 micrometers thick when uncompressed and compressed respectively (about 38% compression). However, if there were +50 micrometer variation possible in each of the groove depths of the two adjacent flow fields and in the molded seal itself, the possible range of compression in sealing element 28b would be about 14-56%. At the upper limit, sealing element 28b may detach from the MEA subassembly and thus would be unacceptable. And, the total possible variation would be ±200 micrometer for sealing element 29b (±50 micrometers for each seal groove, molded seal and MEA thickness), with a resulting possible wide range of compression of about 9-40%. On the other hand, consider the embodiment shown in FIG. 3c with similar groove depth variation, but employing a sealing element 29c of about 1850 micrometers when uncompressed (about 42% compression) and an inboard pad 28c thickness of about 340 micrometers (0% compression). Here, the possible range of compression in inboard pad 28c would then be about 0-25% while in sealing element 29c it would be about 32-51%. These ranges are much improved, in that the upper limit of compression may be insufficient to damage inboard pad 28c. Further, while a high compression is required on sealing element 29c, the range over which it is compressed is relatively narrow which is desirable for a reliable seal.

Aside from being more tolerant to variations in the thickness of stack components, the embodiment of FIG. 3c includes several other advantageous features. Chamfers 31c are provided on the edges of inboard pad 28c at the interfaces with electrodes 23 and 24. This reduces the shear stress concentration at this interface thereby reducing the risk of material failure. Inboard pad 28c also may be used as an alignment feature when assembling a cell stack. For instance, pad 28c can be aligned against surfaces 32 and 33 of flow field plates 25 and 26 during assembly, thereby centering the MEA assembly between the plates.

Further, the cross-sectional shape of sealing element 29c in FIG. 3c is not a simple circle but instead is described by two, slightly vertically offset circles, thereby increasing its height/width aspect ratio. As the shape changes under a small amount of compression, the circles effectively become concentric. Thus, when compared to a sealing element with a circular cross-section, this offset effectively allows for a small amount of applied "precompressive" load without affecting the stability of the seal. In turn, the volume occupied by the seal can be reduced.

Edge seal 21c may also include insulating tab 34, which is useful for electrically insulating flow field plate 25 from adjacent plate 26 and also for protecting sealing element 29c from damage during stack assembly. Like inboard pad 28c, insulating tab 34 also can serve to limit the compression applied to sealing element 29c.

In FIG. 3c, flow field plates 25 and 26 desirably include retaining walls 35 which can be used to prevent edge seal 21c from blowing out in the event of an overpressurization within the fuel cell stack. When pressure conditions return to normal within the stack, edge seal 21c may then reseat, thereby resealing the cell.

The improved MEA with integrated edge seal 21c shown in FIG. 3c can be fabricated in much the same way as those disclosed in the aforementioned U.S. Pat. No. 6,057,054 (incorporated by reference in its entirety). Edge seal 21c may be cast in place, in one step, on a suitably sized, flush-cut MEA subassembly using liquid injection molding (LIM) techniques and a suitable polymerizable liquid sealant material. The presence of inboard pad 28c in the edge seal design assists in the LIM process since the cavity it occupies in the mold initially provides an easy path for the liquid sealant material to access and fill regions 27 in electrodes 23 and 24.

Elastomer materials that are suitable for sealing functions when under significant compression, e.g., >30%, are generally suitable as materials for edge seal 21c. The materials must also be chemically compatible with the environment within the SPE fuel cell. For instance, a low viscosity liquid silicone elastomer may have suitable mechanical properties for this application. When polymerized, certain such silicones are characterized by a Shore A hardness of about 40 and a simple tension modulus of about 0.2 MPa at 40% strain. Other elastomers which are chemically compatible and have similar mechanical characteristics may however be contemplated for use instead. For instance, certain grades of EPDM (ethylene-propylene-diene terpolymer) or fluoroelastomers may be suitable as well.

In designing an integrated edge seal appropriate for a given MEA subassembly, an important parameter to determine is the interface stress limit for the seal material and electrode combination to be employed. (This interface stress limit is a function of the pore and surface structure of the electrodes as well as the type of seal material employed.) Once this limit is determined, appropriate dimensions can be readily calculated for the various structures making up the edge seal in order to suit the given MEA subassembly. Within the possible tolerances of the various fuel cell components, the inboard pad should be sized such that the interface stress limit is not exceeded when the whole MEA assembly is at the upper compression limit. The sealing element is sized to remain significantly compressed, and hence to seal reliably, over the entire possible compression range.

The interface stress limit is readily determined empirically. A simple method involves preparing an elastomer/electrode sample where an elastomer "pad" with a square profile of known size is cast onto an electrode similar to that employed in the desired MEA subassembly. The cast elastomer "pad" additionally impregnates and fully saturates the pores of the electrode. The sample "pad" is then compressed between flat plates until it visually shears from the electrode. (In the case of a low viscosity silicone on a carbon fiber paper electrode, the appearance of the interface changes from black to silver when it shears off.) The values from this empirical test can then be used to calculate the interface stress limit and the compression limit for a pad of any shape.

The following examples have been provided to illustrate certain aspects of the invention but should not be construed as limiting in any way.

EXAMPLES

In the following, conventional MEA subassemblies were employed having a NAFION® 112 electrolyte membrane and electrodes which contained gas diffusion layers made of TGP-60, and a carbon fiber paper product of Toray Industries. A silicone elastomer material was selected for use as the seal material, which had similar mechanical characteristics to the aforementioned low viscosity silicones.

The interface shear stress limit for this seal material/electrode combination was determined empirically as described above. A silicone sample (4 mm square in section and 2 mm high) was cast into/onto a TGP-60 carbon fiber paper layer. Under load, the sample sheared at the interface with the carbon fiber paper at 25% compression. This corresponded to a maximum stress at the interface (or interface shear stress limit) of 1.2 MPa.

Two different MEA with integrated edge seals designs were then evaluated which employed these materials. A comparative embodiment was similar to that depicted in FIG. 3b. The MEA subassembly was about 440 micrometers thick when compressed. The height of sealing element 28b on each side of the MEA subassembly outside of the electrodes was about 390 micrometers. Sealing element 29b was about 1220 micrometers thick. An inventive embodiment was similar to that depicted in FIG. 3b. The MEA subassembly was also about 440 micrometers thick. The height of each side of inboard pad 28c outside of the electrodes was 340 micrometers thick. Sealing element 29c was about 1850 micrometers thick and had a cross-sectional shape described by two circles vertically offset by 0.35 mm.

Figure 4A:
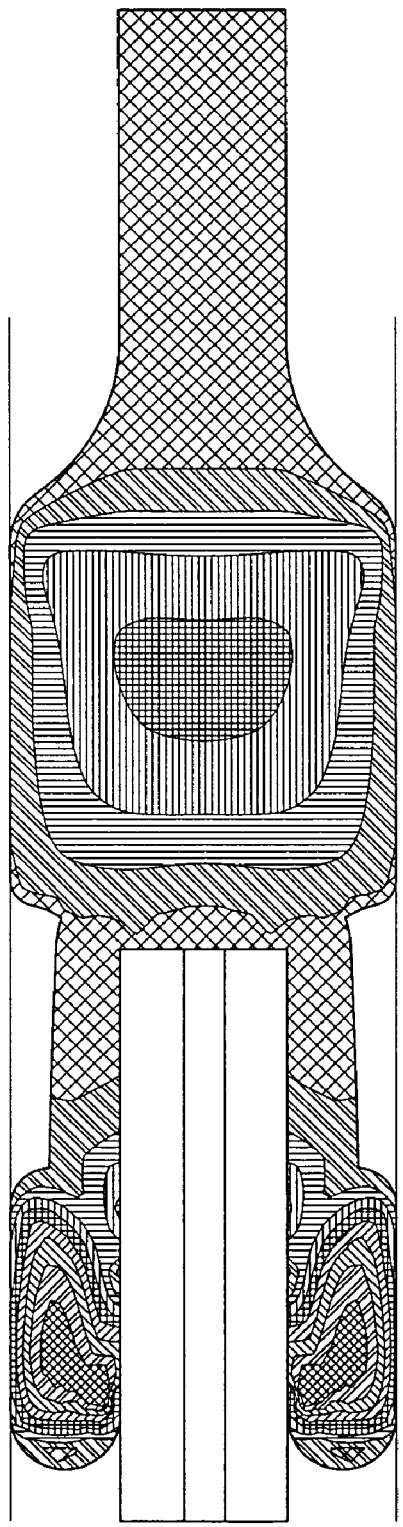
FIG. 4a shows the strain profile of the edge seal of the second prior art MEA of FIG. 3b under nominal compression.
Figure 4B:
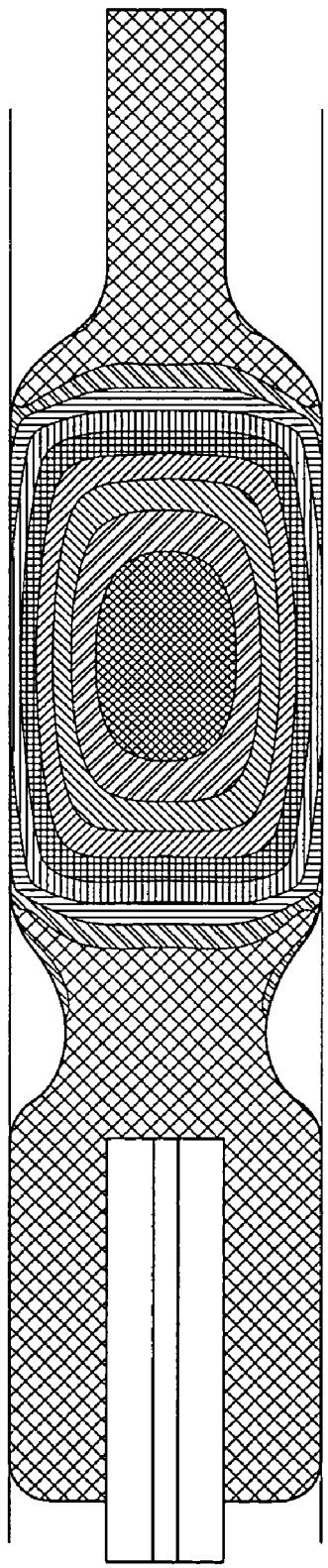
FIG. 4b shows the strain profile of the edge seal of the inventive MEA of FIG. 3c under nominal compression.

The strain profiles of each of the comparative and inventive edge seals under load were modeled using finite element analysis and Ansys/Multiphysics software. FIGS. 4a and 4b show the strain profiles of the comparative and inventive edge seals, respectively, when nominally compressed. In the case of the comparative example (FIG. 4a), the nominal compressed thickness of edge seal 21b was about 920 micrometers. In the case of the inventive example (FIG. 4b), the nominal compressed thickness of edge seal 21c was about 1120 micrometers. In FIGS. 4a and b, the bar chart at the bottom indicates the amount of strain (for instance, the dark solid fill indicates the lowest strain). As is apparent in FIG. 4a, sealing element 28b is under substantial strain while sealing element 29b is only moderately strained. In FIG. 4b however, inboard pad 28c is virtually unstrained while sealing element 29c is under substantial strain. These Figures demonstrate the efficacy of the inventive edge seal in reducing strain at the seal/electrode interface.

Figure 5:
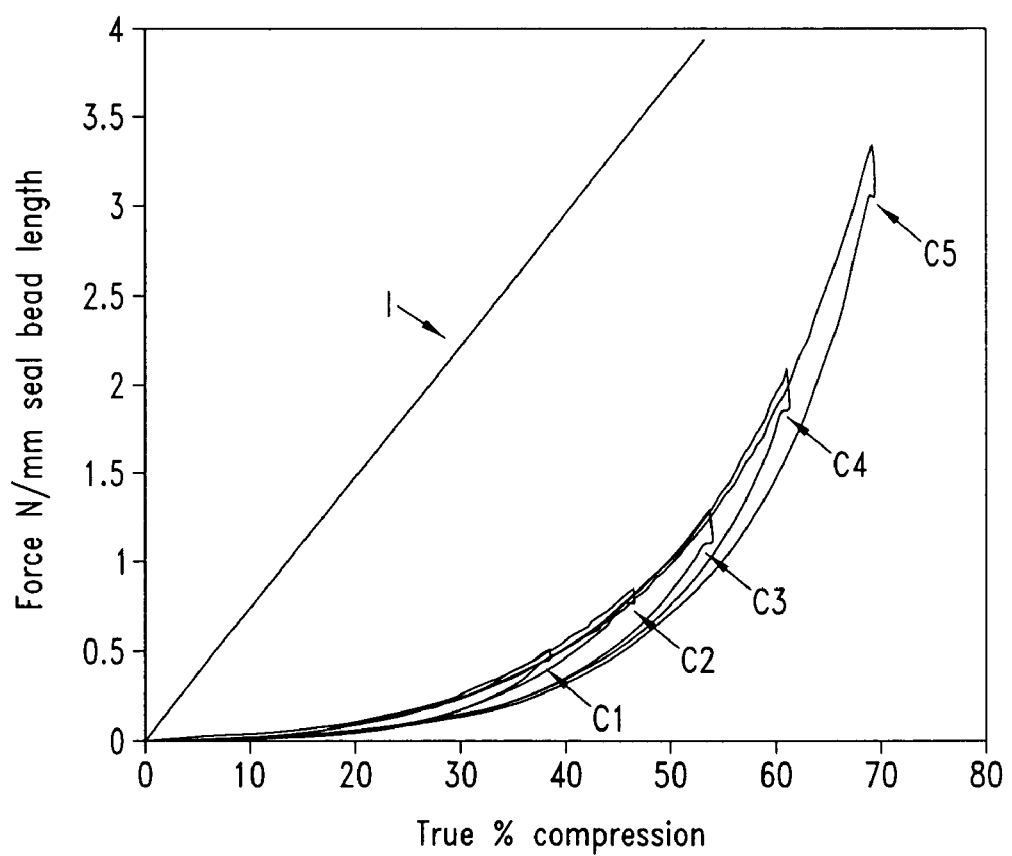
FIG. 5 compares the cyclic compression-recovery characteristics of the edge seal of the second prior art MEA of FIG. 3b to those of the edge seal of the inventive MEA of FIG. 3c.

The cyclic compression and recovery characteristics of the comparative and inventive edge seals were also measured and are shown in FIG. 5. (In FIG. 5, the first five cycles for the comparative edge seal are shown and are denoted C1, C2, etc. respectively. For the inventive edge seal, 10 cycles are shown but these are simply denoted as "I" because the cycles essentially overlap.) Edge seal I showed a linear response characteristic and required greater force for a given compression than edge seal C. Thus, edge seal I should be capable of containing higher pressures than edge seal C. Further, unlike edge seal C, edge seal I showed no signs of degradation with cycling during this testing (i.e., no hysteresis observed in response with cycling).

Figure 6:
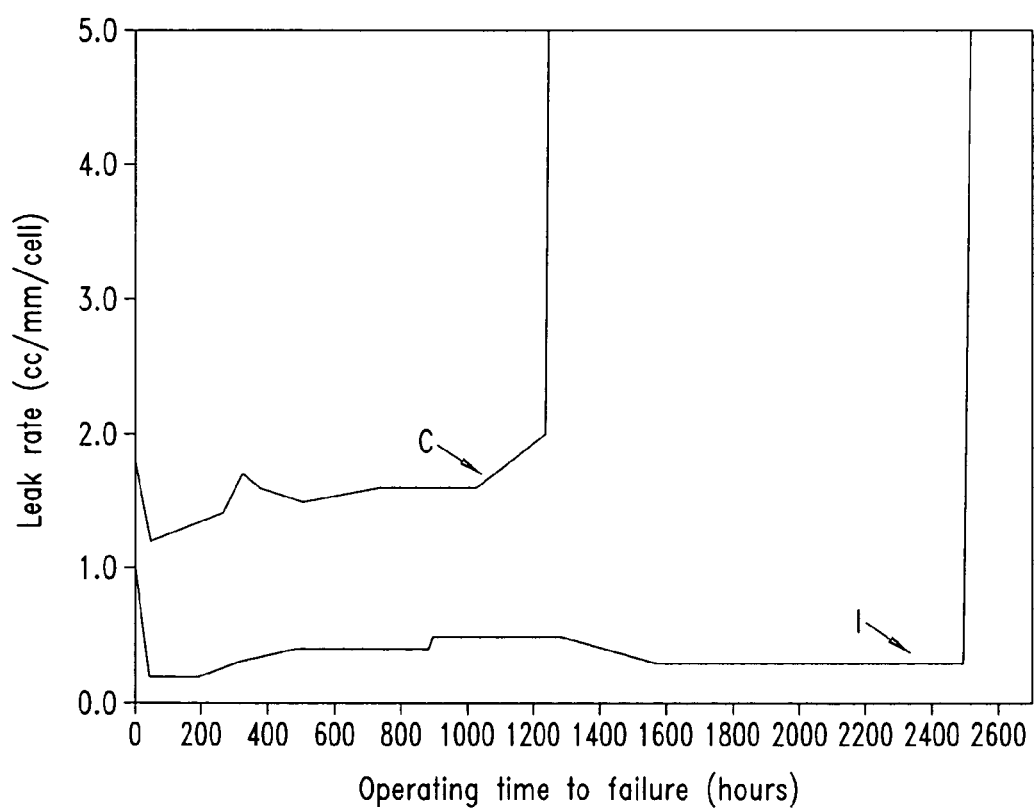
FIG. 6 compares the leak rate versus operating time characteristics of the edge seal of the second prior art MEA of FIG. 3b to those of the edge seal of the inventive MEA of FIG. 3c.

Finally, two 10-cell fuel cell stacks were assembled and operated under high rate discharge, steady state conditions to determine the time to failure of the seals. One cell stack, denoted "C", was assembled using the above comparative MEAs with integrated seal, while the other cell stack, denoted "I", was assembled using the above inventive MEAs with integrated seal. The total reactant leak rate (i.e., of both reactants) was monitored for each stack over time and the results are given as an average leak rate per cell versus operating time in FIG. 6. The initial background leak rate for the cells in stack I was significantly lower than that for the cells in stack C. After about 1200 hours of continuous high rate operation, a seal or seals in stack C failed and stack C developed a substantial leak. However, stack I ran for over twice as long (over 2400 hours) before developing a similar leak.

As illustrated in the preceding examples, an MEA with integrated edge seal I shows significant improvements over an MEA with edge seal C.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A solid polymer electrolyte fuel cell having a membrane electrode assembly with an integrated seal, the assembly to be compressed to a nominal thickness by a compressing surface; said membrane electrode assembly comprising:
   a membrane electrode subassembly comprising a membrane electrolyte, a porous cathode electrode and a porous anode electrode wherein the membrane electrode subassembly is planar and has two major surfaces; and
   an edge seal made of a seal material, the edge seal comprising:
   a) an inboard pad adjacent to the two major surfaces at the edges of the membrane electrode subassembly wherein the pad saturates the pores at the edges of the electrodes around the periphery of the membrane electrode subassembly, and wherein the pad is thicker than the membrane electrode subassembly at least at the edges and the pad thickness is such that the stress on the pad is less than the electrode interface stress limit for the seal material when the assembly is compressed to the nominal thickness;
   b) a flexible coupling adjacent the inboard pad and the edge of the membrane electrode subassembly wherein the coupling thickness is less than that of the inboard pad and is such that a gap remains between the compressing surface and the coupling when the assembly is compressed to the nominal thickness; and
   c) a sealing element adjacent the flexible coupling wherein the thickness of the sealing element is greater than that of the inboard pad and is such that the sealing element is compressed more than the inboard pad when the assembly is compressed to the nominal thickness; wherein,
   the compressing surface is a flow field plate; and
   the inboard pad comprises a chamfer adjacent the electrode surface and the flow field plate comprises an alignment feature to align with the chamfer on the inboard pad.

2. The membrane electrode assembly of claim 1, wherein the inboard pad is compressed less than about 25% when the assembly is compressed to the nominal thickness.

3. The membrane electrode assembly of claim 1, wherein the sealing element is compressed greater than 30% when the assembly is compressed to the nominal thickness.

4. The membrane electrode assembly of claim 1, wherein the seal material is an elastomer.

5. The membrane electrode assembly of claim 4 wherein the elastomer is a silicone characterized by a Shore A hardness of about 40 and a simple tension modulus of about 0.2 MPa at 40% strain.

6. The membrane electrode assembly of claim 5 wherein the electrode interface stress limit is 1.2 MPa.

7. The membrane electrode assembly of claim 4 wherein the elastomer is an ethylene-propylene-diene terpolymer.

8. The membrane electrode assembly of claim 4 wherein the elastomer is a fluoroelastomer.

9. The membrane electrode assembly of claim 1, wherein the porous cathode and anode electrodes comprise carbon fiber paper.

10. The membrane electrode assembly of claim 1, wherein the shape of the sealing element is described by two offset circles perpendicular to the major surfaces of the membrane electrode subassembly.

11. The membrane electrode assembly of claim 1, comprising an insulating tab adjacent the sealing element.

12. The fuel cell of claim 1, wherein the flow field plate comprises a retaining wall to retain the sealing element.

* * * * *